United States Patent
Wu et al.

(10) Patent No.: US 7,471,842 B2
(45) Date of Patent: Dec. 30, 2008

(54) METHOD AND APPARATUS FOR DYNAMICALLY DETECTING PIXEL VALUES

(75) Inventors: Don Wu, Hsintien (TW); C M Chien, Hsintien (TW)

(73) Assignee: Via Technologies, Inc., Taipei Hsien (TW)

( * ) Notice: Subject to any disclaimer, the term of this patent is extended or adjusted under 35 U.S.C. 154(b) by 574 days.

(21) Appl. No.: 11/113,038

(22) Filed: Apr. 25, 2005

(65) Prior Publication Data

US 2006/0045333 A1 Mar. 2, 2006

(30) Foreign Application Priority Data

Aug. 30, 2004 (TW) .............. 93126074 A

(51) Int. Cl.
*G06K 9/40* (2006.01)
*H04N 9/64* (2006.01)

(52) U.S. Cl. ...................... 382/254; 348/245

(58) Field of Classification Search ........... 382/100, 382/199, 205, 254, 260–275, 312; 348/207.99, 348/229.1, 230.1, 243–247
See application file for complete search history.

(56) References Cited

U.S. PATENT DOCUMENTS

| | | | | |
|---|---|---|---|---|
| 4,589,028 A | * | 5/1986 | Ochi | 348/247 |
| 4,649,430 A | * | 3/1987 | Hynecek | 348/245 |
| 5,144,446 A | * | 9/1992 | Sudo et al. | 348/246 |
| 5,532,484 A | * | 7/1996 | Sweetser et al. | 250/332 |
| 5,805,216 A | * | 9/1998 | Tabei et al. | 348/246 |
| 6,028,628 A | * | 2/2000 | Van Der Valk | 348/246 |
| 6,737,625 B2 | * | 5/2004 | Baharav et al. | 250/208.1 |
| 6,768,512 B1 | * | 7/2004 | Hsieh | 348/246 |
| 6,822,679 B1 | * | 11/2004 | Kulhalli et al. | 348/246 |
| 6,977,681 B1 | * | 12/2005 | Sasai | 348/241 |
| 7,170,529 B2 | * | 1/2007 | Chang | 345/604 |
| 7,283,164 B2 | * | 10/2007 | Kakarala et al. | 348/246 |
| 2004/0032516 A1 | | 2/2004 | Kakarala | |
| 2005/0010621 A1 | * | 1/2005 | Pinto et al. | 708/200 |
| 2005/0030395 A1 | * | 2/2005 | Hattori | 348/246 |
| 2005/0088455 A1 | * | 4/2005 | Chang | 345/603 |
| 2005/0248671 A1 | * | 11/2005 | Schweng | 348/246 |

* cited by examiner

*Primary Examiner*—Bhavesh M Mehta
*Assistant Examiner*—Manav Seth
(74) *Attorney, Agent, or Firm*—Griffin & Szipi, P.C.

(57) ABSTRACT

A pixel value array is provided, which includes an examined pixel value. Several reference pixel values are each subtracted from the examined pixel value to obtain several differences. The sampling pixels of these reference pixel values are spatially adjacent to the sampling pixel of the examined pixel value. The reference and examined pixel values represent the same color. The differences are compared with a reference value. When the absolute values of the differences are all greater than the reference value, the examined pixel value is determined as being wrong.

11 Claims, 3 Drawing Sheets

200

| $R_1$ | G | $R_2$ | G | $R_3$ |
|---|---|---|---|---|
| G | B | G | B | G |
| $R_4$ | G | $R_5$ | G | $R_6$ |
| G | B | G | B | G |
| $R_7$ | G | $R_8$ | G | $R_9$ |

200

| $R_1$ | G | $R_2$ | G | $R_3$ |
|---|---|---|---|---|
| G | B | G | B | G |
| $R_4$ | G | $R_5$ | G | $R_6$ |
| G | B | G | B | G |
| $R_7$ | G | $R_8$ | G | $R_9$ |

Fig. 2

METHOD AND APPARATUS FOR DYNAMICALLY DETECTING PIXEL VALUES

RELATED APPLICATIONS

The present application is based on, and claims priority from, Taiwan Application Serial Number 93126074, filed Aug. 30, 2004, the disclosure of which is hereby incorporated by reference herein in its entirety

BACKGROUND

1. Field of Invention

The present invention relates to a digital color image sensor. More particularly, the present invention relates to a method and apparatus for dynamically determining whether a pixel value is correct and correcting it in real time.

2. Description of Related Art

Most of modern digital color camera systems use sensors, such as charge-coupled devices (CCDs) or CMOS sensors, to capture images. Generally, sensors convert incident light into electrical signals by the principle of electrons (or holes) being excited by photons transiting between different energy levels.

Sampling pixels for red, green and blue light are separately prepared for detecting different colors. For example, in the Bayer color filter array (CFA), which is usually used and can effectively decrease the sensor size, each sampling pixel in the array manages only one color, such as one of the primary colors (i.e. red, green and blue). In order to provide a complete color spectrum and enhance resolution, the sensor has to perform color interpolation to obtain two lacking colors for each sampling pixel.

In practice, certain sampling pixels, such as defective sampling pixels, may obtain wrong pixel values. If these wrong pixel values are not corrected, they will affect image quality. The simple conventional correction method includes testing sampling pixels before leaving the factory, recording positions of defective sampling pixels, and adding additional corrections for pixel values corresponding to the defective sampling pixels in a subsequent data process.

However, the conventional correction method fails to correct problems that do not happen during manufacture of the sampling pixels. These problems include, for example, defective pixels generated by long-time use or by old devices, wrong pixel values obtained due to dust-covered lenses, and different defective pixel positions occurring due to exchanging sensor heads.

U.S. patent application publication No. 2004/0032516 A1 disclosed a "digital image system and method for combining demosaicing and bad pixel correction", which interpolates sensor values for pixels immediately spatially adjacent to the current pixel being examined to detect defective pixels and uses the interpolated values for demosaicing. However, the conventional technique disclosed by the patent application entails complicated circuitry and enormous computational effort such that a high-speed operating system is needed, increasing design and manufacturing costs. Moreover, an image derived by the conventional technique is blurred and vague because the image is processed by too many operations.

SUMMARY

It is therefore an aspect of the present invention to provide a method for dynamically detecting pixel values. The method dynamically detects and corrects wrong pixel values in real time and prevents the blurred and vague images caused by myriad and complicated value operations.

It is another aspect of the present invention to provide an apparatus for dynamically detecting pixel values, which has simple circuitry, omits myriad value operations, and is suitable to combine with an original color interpolation device for decreasing the design and manufacturing costs.

One preferred embodiment of the present invention provides a method and apparatus for dynamically detecting pixel values. A pixel value array is stored in a register and has an examined pixel value. A subtractor is used to subtract the examined pixel value from each of a plurality of reference pixel values to obtain a plurality of differences. Sampling pixels of the reference pixel values are spatially adjacent to a sampling pixel of the examined pixel value, and the reference and examined pixel values represent the same color. A comparator is used to compare the differences with a reference value. When absolute values of the differences are all greater than the reference value, the comparator determines that the examined pixel value is wrong.

According to one of the preferred embodiments, the apparatus further comprises an adder and a divider. When the examined pixel value is wrong, the adder and the divider derive an average value of the reference pixel value to replace the examined pixel value. When one of the absolute values is not greater than the reference value, the comparator reserves the examined pixel value.

According to one of the preferred embodiments, the sampling pixels of the reference pixel values are equidistant from the sampling pixel of the examined pixel value. The sampling pixels of the reference pixel values surround the sampling pixel of the examined pixel value. Moreover, the apparatus is combined with a color interpolation device.

The invention determines whether a pixel value is wrong by comparing the subtracted differences with the reference value, of which the circuits are simple and without myriad value operations, and therefore cost is substantially reduced. Moreover, the invention can be combined with a color interpolation device originally used in the sensor without complicated circuit amendments, and therefore difficulty and costs of design and manufacturing are effectively decreased. In addition, compared to the blurred image derived by the conventional technique, the image derived by this invention is processed by less value operations, and thus the image quality is improved.

It is to be understood that both the foregoing general description and the following detailed description are examples and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

FIG. 2 is a schematic view of a pixel value array of one preferred embodiment of the present invention.

DESCRIPTION OF THE PREFERRED EMBODIMENTS

Figure 1A:
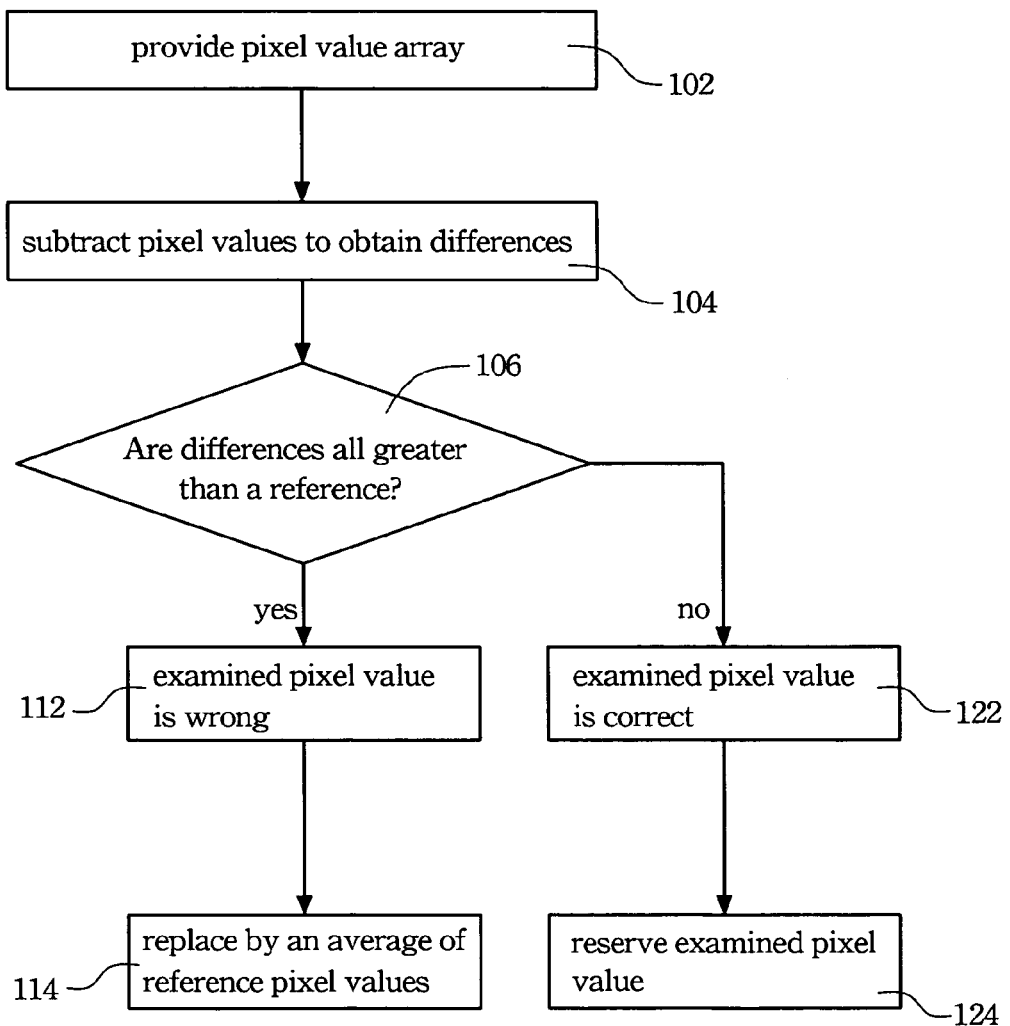
FIG. 1A is a flow chart of one preferred embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
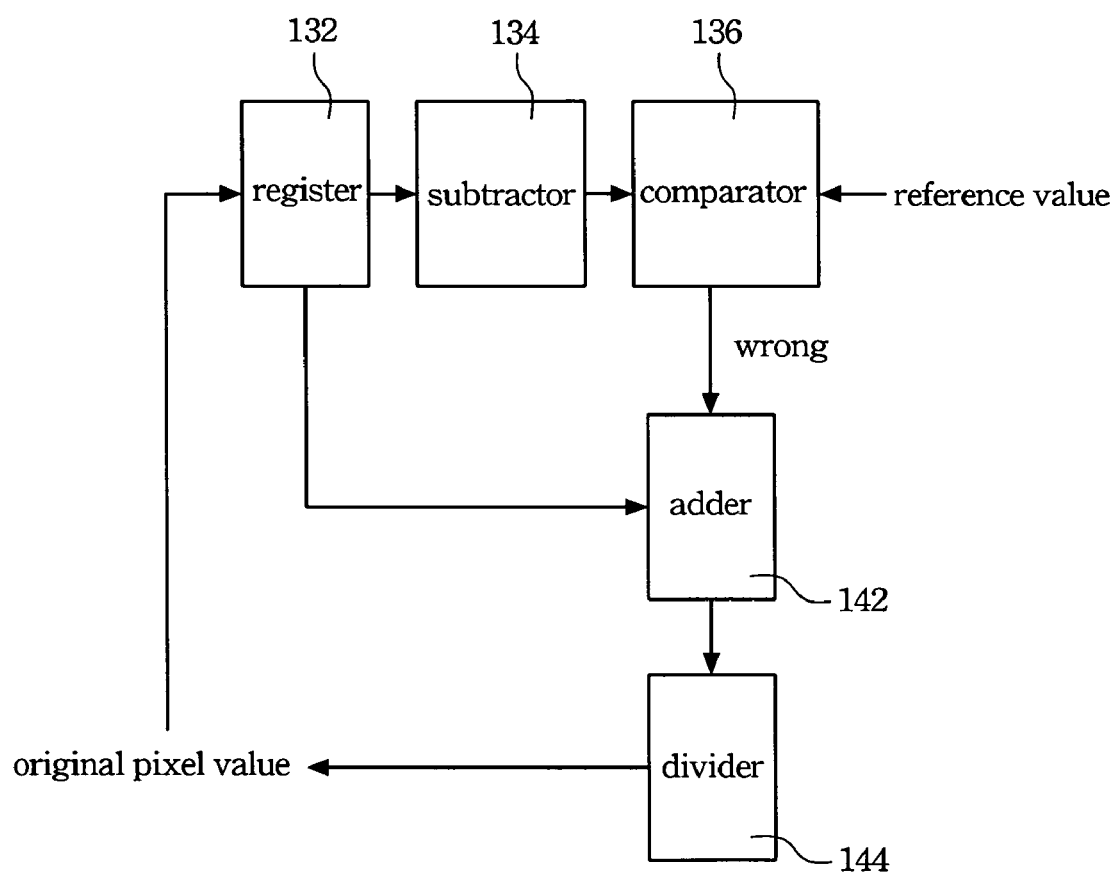
FIG. 1B is a schematic view of one preferred embodiment of the present invention.

FIG. 1A is a flow chart of one preferred embodiment of the present invention, and FIG. 1B is a schematic view of one preferred embodiment of the present invention.

Firstly, a sensor, such as a charge-coupled device, a CMOS sensor or a sensor with a color filter array, converts incident light into a plurality of original pixel values through the use of sampling pixels that manage different colors. Of course, if the incident light is monochromatic light or if a monochromatic image is needed, sampling pixels that are relegated to a single color or that cannot distinguish between different colors can be used. Next, according to the spatial distribution of sampling pixels, partial or total pixel values are stored in a register 132 to form a pixel value array (step 102).

When examining the pixel values contained in the pixel value array to determine whether one or more of them are bad (or faulty), the pixel values can be examined one by one. For example, the pixel values are examined one by one from the upper-left pixel value array in sequences of rows and lines. While examining a certain pixel value, the whole pixel value array can be regarded as containing an examined pixel value and a plurality of reference pixel values. The sampling pixels of the reference pixel values surround the sampling pixel of the examined pixel value, and the reference and examined pixel values represent the same color. For example, if the examined pixel value represents red, the reference pixel values selected from the pixel value array must also represent red. Next, the examined pixel value is subtracted from each of the reference pixel values by a subtractor 134 to obtain a plurality of differences corresponding to each reference pixel value (step 104).

A comparator 136 is used to compare the differences to a reference value (step 106). When absolute values of the differences are all greater than the reference value, the examined pixel value is determined to be wrong (step 112). At this time, if further correcting the wrong pixel value is desired, an average value of the reference pixel value can be derived by an adder 142 and a divider 144 to replace the examined pixel value (step 114). In another aspect, when one of the absolute values is not greater than the reference value, the examined pixel value is determined to be correct (step 122). At this time, the examined pixel value is reserved, and a next examined pixel value is then obtained (step 124).

The pixel value determined to be correct or the originally wrong but corrected pixel value can be used to process other examined pixel values. Moreover, the reference value is adjustable according to the required image quality or the sensor performance. Furthermore, different portions of the same pixel value array can use different reference values.

FIG. 2 is a schematic view of a pixel value array of one preferred embodiment of the present invention. The following descriptions illustrate examination stages of the preferred embodiment to clearly interpret the invention in detail.

As illustrated in FIG. 2, a pixel value array 200 is a 5×5 array of pixel values, and the spatial arrangement thereof is that of a Bayer color filter array. In the pixel value array 200, R represents pixel values for red, G represents pixel values for green, and B represents pixel values for blue.

Firstly, $R_5$ in the pixel value array is selected as the examined pixel value, and $R_2$, $R_4$, $R_6$ and $R_8$, which surround, are nearest to and are the same color as $R_5$, are selected as the reference pixel values. The examined pixel value $R_5$ is subtracted from each of the reference pixel values $R_2$, $R_4$, $R_6$ and $R_8$ to obtain a plurality of differences, and then the differences are compared to the reference value.

As stated above, when absolute values of the differences are all greater than the reference value, the examined pixel value is determined to be wrong. The corresponding inequalities (1), (2), (3) and (4) are:

$|R_2-R_5|>\text{reference value}$ (1)

$|R_4-R_5|>\text{reference value}$ (2)

$|R_6-R_5|>\text{reference value}$ (3)

$|R_8-R_5|>\text{reference value}$ (4)

In other words, when the foregoing inequalities (1), (2), (3) and (4) are all met, the examined pixel value $R_5$ is determined to be wrong. At this time, an average value $R_5'$ of the reference pixel values $R_2$, $R_4$, $R_6$ and $R_8$ is used to replace the original examined pixel value $R_5$. The average value $R_5'$ is derived following the equation (5):

$$R_5' = \frac{R_2 + R_4 + R_6 + R_8}{4} \quad (5)$$

In another aspect, when one of the absolute values is not greater than the reference value, the examined pixel value is determined to be correct. At this time, the examined pixel value is reserved, and a next examined pixel value is then examined.

Four same-color pixel values $R_2$, $R_4$, $R_6$ and $R_8$, which are nearest to and surround the examined pixel value $R_5$, are selected in the preferred embodiments to be the reference pixel values. However, according to other embodiments of the present invention, other same-color pixel values $R_1$, $R_3$, $R_5$ and $R_7$, which are not nearest to the examined pixel value $R_5$, can also be selected as the reference pixel values; or pixel values in the outer circle of a 7×7 pixel value array can also be selected as the reference pixel values. The point of the present invention is that the reference pixel values that surround and have the same color are used as the examined pixel value, but this does not limit what specific reference pixel values are used.

Furthermore, if a more accurate determination and/or a better average value are desired, more same-color pixel values can be selected relative to the hardware operation ability, such as when pixel values $R_1$, $R_2$, $R_3$, $R_4$, $R_6$, $R_7$, $R_8$ and $R_9$ are used together as the reference pixel values for determining and/or calculating the average value.

In addition, the same-color pixel values adjacent to the examined pixel value are used for determining and calculating. Therefore, for the examined pixel value positioned on one edge of the pixel value array, the preferred embodiments preserve one or more columns or rows of dummy pixel values on edges of the pixel value array from being processed, thus eliminating the problem of the edge examined pixel value lacking enough reference pixel values for determining or calculating.

In conclusion, the circuitry of the apparatus for dynamically detecting pixel values is simple and without myriad value calculations, and the apparatus can share the same circuitry with the color interpolation device originally used in the sensor. In particular, the invention omits recording the positions of bad sampling pixels beforehand, and therefore the invention is not affected even when a sensor is replaced, when bad pixels are generated or when dust adheres onto the sensor later.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for dynamically detecting pixel values, comprising:
    receiving a pixel value array, wherein one or more columns or rows of pixel values positioned on edges of the pixel value array are treated as dummy pixel values that are excluded from being selected as the examined pixel value;
    selecting an examined pixel value from the pixel value array;
    subtracting the examined pixel value from each of a plurality reference pixel values to obtain a plurality of differences, wherein sampling pixels of the reference pixel values are spatially adjacent to a sampling pixel of the examined pixel value, and the reference and examined pixel values represent the same color; and
    when absolute values of the differences are all greater than a reference value, the examined pixel value is determined as being wrong.

2. The method of claim 1, wherein when the examined pixel value is wrong, an average value of the reference pixel value is used to replace the examined pixel value.

3. The method of claim 2, wherein the examined pixel value replaced by the average value is further used to examine another examined pixel value.

4. The method of claim 1, wherein when one of the absolute values is not greater than the reference value, the examined pixel value is reserved.

5. The method of claim 4, wherein the reserved examined value is further used to examine another examined pixel value.

6. The method of claim 1, wherein the sampling pixels of the reference pixel values are equidistant from the sampling pixel of the examined pixel value.

7. The method of claim 1, wherein the method further comprises:
    selecting a plurality of sampling pixels surrounding the sampling pixel of the examined pixel value to be the sampling pixels of the reference pixel values.

8. The method of claim 1, wherein the sampling pixels of the reference pixel values comprise four sampling pixels positioned on upper, lower, left and right sides of the sampling pixel of the examined pixel value.

9. The method of claim 1, wherein the sampling pixels of the reference pixel values comprise four sampling pixels positioned on upper-right, upper-left, lower-left and lower-right sides of the sampling pixel of the examined pixel value.

10. The method of claim 1, wherein a color interpolation device is used to carry out the method.

11. The method of claim 1, wherein the pixel value array comprises at least 5×5 pixel values.

* * * * *

UNITED STATES PATENT AND TRADEMARK OFFICE
CERTIFICATE OF CORRECTION

PATENT NO.         : 7,471,842 B2                                                       Page 1 of 1
APPLICATION NO. : 11/113038
DATED              : December 30, 2008
INVENTOR(S)        : Don Wu et al.

It is certified that error appears in the above-identified patent and that said Letters Patent is hereby corrected as shown below:

Title Page - Should read

(75)  Inventors:   Don WU, Hsintien (TW); C M Chien, Hsintien (TW); Joe LIU, Hsintien (TW)

Signed and Sealed this

Third Day of March, 2009

JOHN DOLL
*Acting Director of the United States Patent and Trademark Office*